United States Patent [19]

Huitema

[11] 4,039,201
[45] Aug. 2, 1977

[54] TRACTOR IMPLEMENT LIFT HEIGHT AMPLIFIER

[75] Inventor: Thomas Woodford Huitema, Racine, Wis.

[73] Assignee: J. I. Case Company, Racine, Wis.

[21] Appl. No.: 720,891

[22] Filed: Sept. 7, 1976

[51] Int. Cl.² .......................................... A01B 59/043
[52] U.S. Cl. ............................... 280/461 A; 172/444
[58] Field of Search .......... 280/461 A, 461 R, 460 A, 280/456 A; 172/444, 445, 439, 677

[56] References Cited
U.S. PATENT DOCUMENTS

| | | | |
|---|---|---|---|
| 2,844,083 | 7/1958 | Du Shane | 172/444 X |
| 3,380,537 | 4/1968 | Morkoski | 172/445 |

Primary Examiner—Philip Goodman
Assistant Examiner—John A. Pekar
Attorney, Agent, or Firm—Arthur J. Hansmann

[57] ABSTRACT

A tractor implement lift height amplifier including a lift arm mounted on a rock shaft on a tractor and having links connected to the arm and with the links connected with the draft arms attached between the tractor and a draft implement. The lift arm and links are arranged for abutting engagement when the lift arm is pivoted upwardly, to thereby effect a solid, rather than articulated, lift connection so that the additional upward pivoting of the lift arm will induce maximum lifting of the implement itself.

10 Claims, 5 Drawing Figures

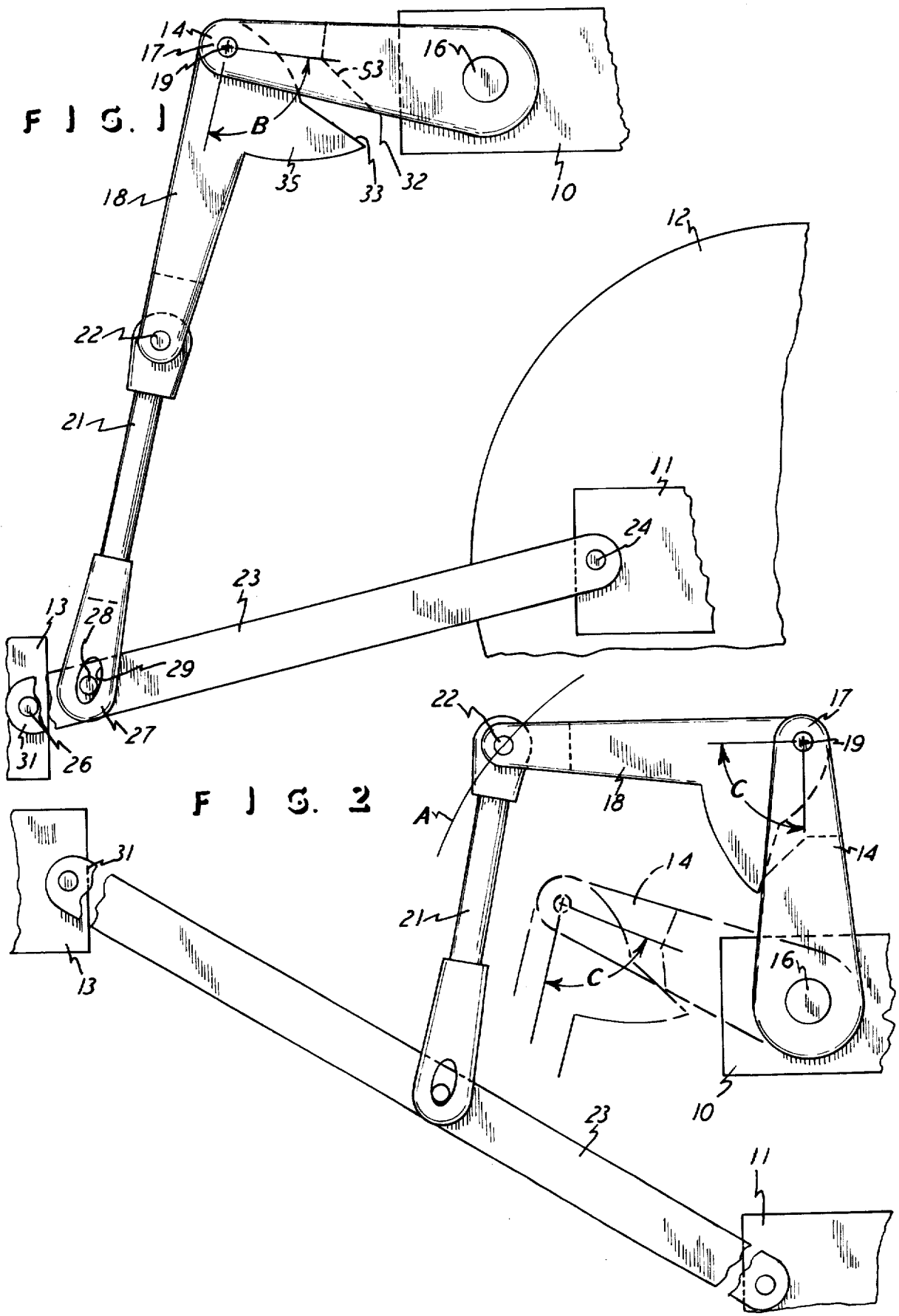

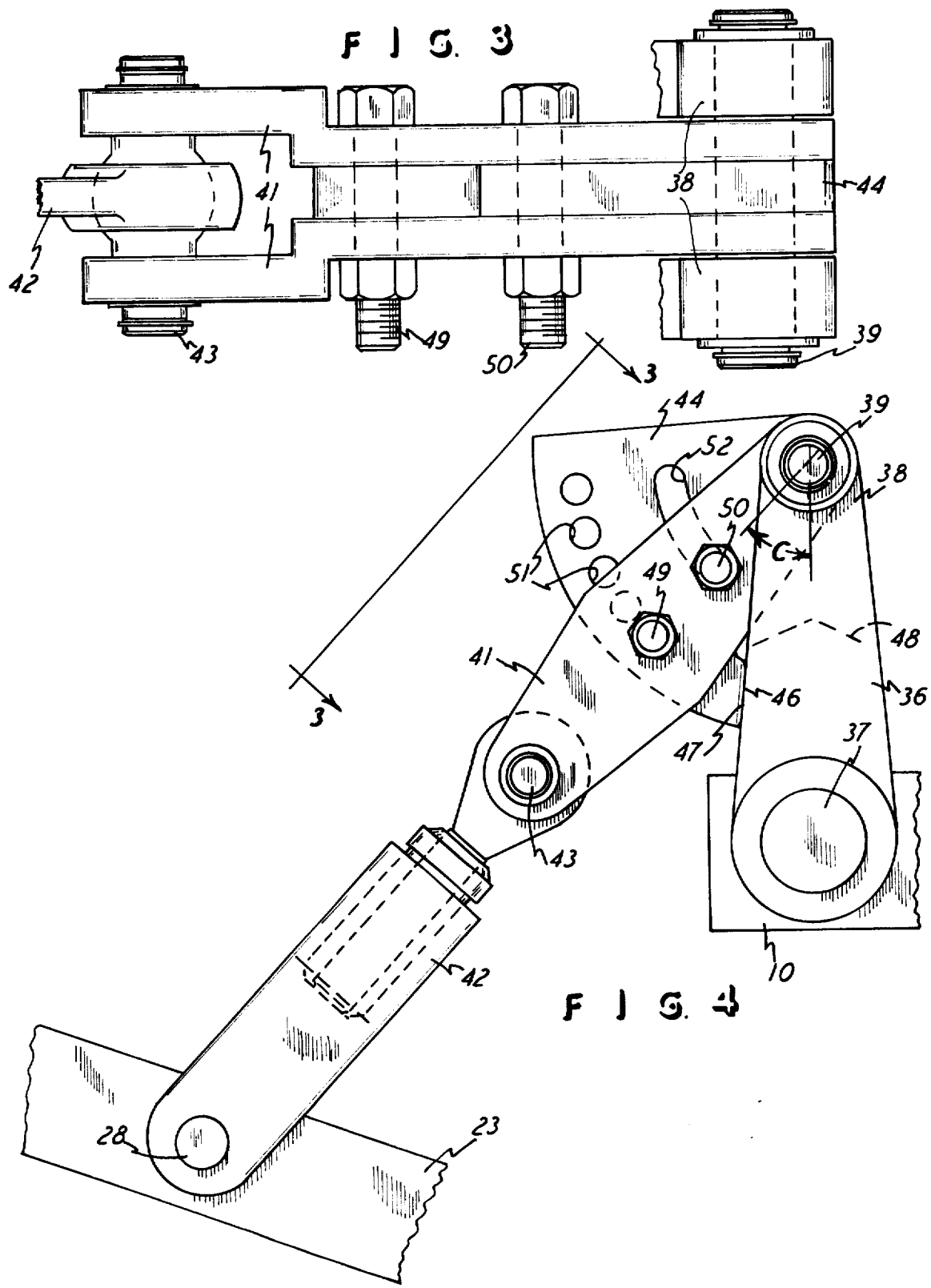

TRACTOR IMPLEMENT LIFT HEIGHT AMPLIFIER

This invention relates to a tractor implement lift height amplifier, and, more particularly, it relates to a lift height amplifier interconnected between a tractor and an implement whereby pivotal action of the lift arm is transmitted to the implement in maximum lifting effect.

BACKGROUND OF THE INVENTION

The prior art is already aware of various attachments between tractors and implements, and these attachments are arranged for the pulling of the implement behind the tractor, and they are also arranged for lifting the implement off the ground for a transport position of the implement. In positioning the implement in a partly raised or even a fully raised and transport position, the prior art encounters a problem of having adequate vertical movement in the lifting members in order to induce sufficient vertical movement of the implement itself, such that the implement can be disposed in a fully raised and thus transport position. That is, it is common practice to use a lift arm mounted on a rock shaft or the like, and once the extending end of the lift arm is in a raised position, say a position substantially above the level of the pivot of the rock shaft itself, then further pivoting of the lift arm will not produce sufficiently significant lifting action for the implement itself. That is, at that end or maximum position of lift effort produced by the lift arm, further rotation of the lift arm creates more horizontal displacement, rather than vertical displacement, of the lifting end of the lift arm, and that fails to produce the desired lifting action of the implement.

Accordingly, the present invention recognizes the aforementioned problem, and it overcomes the problem by providing a tractor implement lift height amplifier which creates maximum lifting effort, and with the lifting effort being substantially in direct proportion to the amount of pivot of the lift arm itself. That is, the present invention provides a lift height amplifier which produces a vertical lifting action even when the lifting arm is itself moving in a substantially horizontal direction at its extending end. In accomplishing this objective, the present invention provides an arrangement of pivotally-connected lift members which interengage to restrict the pivoting action of the members relative to each other when the members are approaching the end of their lifting action, and, at that time, the lifting members interengage each other to alter the length of the effective lift arm and to thereby more nearly translate the additional rotary or pivot action to the vertical lift action.

A further object of this invention is to provide a tractor implement lift height amplifier which can utilize the lift members and the draft arm members and the attachments between the tractor and the implement, all as now in use commercially, and still provide the lift height amplification, accomplished by this invention, in effecting maximum lift for the implement. In accomplishing this objective, the present invention provides a simplified and yet sturdy and reliable type of connection between the tractor and the implement, both for the purpose of draft attachment and lift attachment of the implement to the tractor.

Accordingly, it is the main object of this invention to provide the tractor implement lift height amplifier wherein the pivot action of the lift arm itself is converted to maximum lift effort so that the draft-attached implement behind the tractor can be desirably articularly connected with the tractor but yet can be lifted a maximum distance off the ground, such as for placing the implement in transport position.

Other objects and advantages will become apparent upon reading the following description in light of the accompanying drawings.

BRIEF DESCRIPTION OF THE DRAWINGS

FIG. 1 is a side elevational view of one embodiment of this invention, with fragments of a tractor and an implement shown therein.

FIG. 2 is a side elevational view of FIG. 1, with certain parts thereof in a different position, and showing still a third position, in dot-dash lines.

FIG. 3 is a top plan view of another embodiment of this invention and with the view being taken along the line 3—3 shown adjacent to FIG. 4.

FIG. 4 is a side elevational view of the embodiment shown in FIG. 3, and with parts added thereto.

DETAILED DESCRIPTION OF THE PREFERRED EMBODIMENTS

Figure 5:
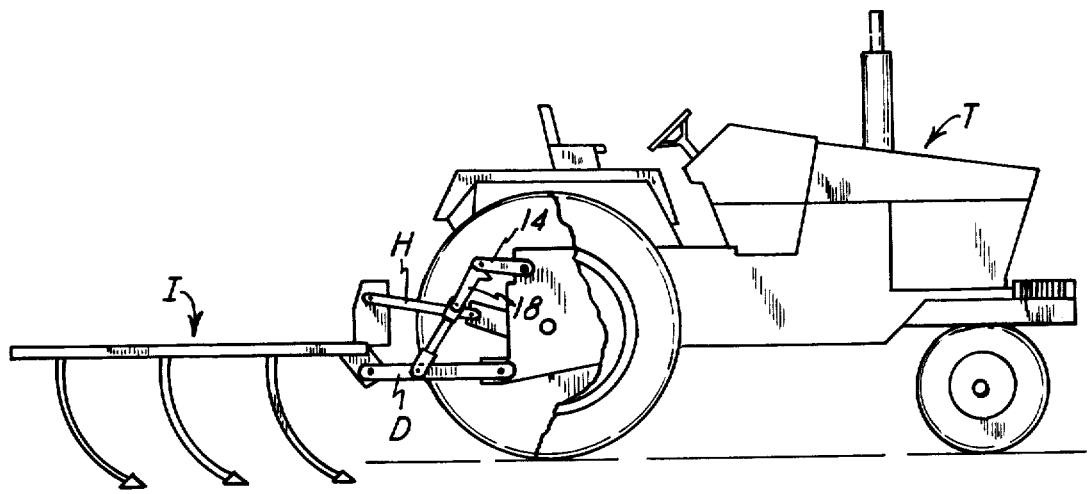
FIG. 5 is a side elevational view of a tractor and an implement.

The shown two embodiments are both arranged to accomplish the lift amplification, and they are suitable for attachment between a conventional type tractor and a conventional type of implement such as in FIG. 5, and the hitch members of this invention, and the tractor and implement, are somewhat arranged in the nature shown in U.S. Pat. No. 3,399,733. That is, a conventional tractor T and a conventional implement I, of FIG. 5, can be draft connected by means of the conventional hitch which includes draft arm D and hitch member H. Accordingly, FIGS. 1-4 show conventional tractor frame pieces 10 and 11 extending rearwardly on a conventional tractor, and FIG. 1 shows a fragment of the tractor rear wheel 12. FIG. 5 shows the novel lift members 14 and 18 which are also shown in FIGS. 1 and 2. As such, a conventional tractor is indicated, and it is arranged in the usual way to draft and lift connect with a conventional implement, which has a conventional frame piece 13 as shown in FIG. 1. The implement can be a plow or harrow, a rake, or any of the other and many well known agricultural implements. Interposed articularly between the tractor and the implement, as shown in FIG. 1, are the several link members, as shown in FIG. 1. Accordingly, a lift arm 14 is pivotally mounted on the tractor on a pivot or rock shaft 16 which is under the influence of a powered member which is unshown but which can be a powered cylinder or the like, as shown in U.S. Pat. No. 3,399,733 for actuating the rock shaft shown in that patent. Thus, the pivot or rock shaft 16 and the lift arm 14 are connected together so that rotation of the shaft 16 induces rotational or pivotal movement of the lift arm 14 to have the extending end 17 of the arm 14 raised and lowered in a vertical plane. The arm 14 is articularly connected to a first link 18, by means of a pivot pin 19 extending between the arm 14 and the upper end of the link 18. The lower end of the link 18 is articularly connected with a second link 21, by means of a pin 22 extending through the lower end of the first link 18 and through the upper end of the second link 22. As such, the embodiment in FIGS. 1 and 2 shows lift members 14 and 18 and 21, all articularly or pivotally connected together and all being movable in response to the rotation of the rock shaft 16 which is under the influence of any suitable powered member, such as mentioned above but unshown herein but which will be readily understood by one skilled in the art.

FIG. 1 further shows a draft arm 23 which is pivotally connected to the tractor frame piece 11 by means of a pivot pin 24 extending through the draft arm 23 and being affixed with the frame piece 11. Also, the extending end of the draft arm 23 is pivotally connected to the implement designated 13, by means of the pivot pin 26. Finally, it will be seen and understood that the lower end of the second link 21 is articularly connected with the draft arm 23 by having the link lower end 27 pinned to the draft arm 23 by means of a pin 28 being connected to the draft arm 23 and extending into a slotted opening 29 in the link lower end 27.

Accordingly, with the arrangement described and as shown in FIG. 1, when the rock shaft 16 is rotated, the lift members 14 and 18 and 21 are suitably moved for raising and lowering the extending end 31 of the draft arm 23 and to thus raise and lower the implement 13.

Accordingly, anyone skilled in the art will understand that the draft and lift members shown in these two sheets of drawings are arranged in pairs or duplicates, on opposite left and right hand sides of the tractor and implement relative to the fore-and-aft directions thereof, and the drawings are showing only one side of these members. Further, it will be understood that a usual three-point type of hitch can be employed, and that could be as shown in FIG. 5 with the lift member H connected between the tractor and the implement such that when the draft arm 13 is raised it raises the shown portion of the implement 13 and it also raises the rearward and unshown portion of the implement 13, and that type of arrangement would be in any suitable manner, such as that shown in FIG. 5, and it could be according to U.S. Pat. Nos. 2,822,739 and 3,220,751, for instance, where the additional lift members are shown connected between the tractor and the implement for raising and lowering of the implement in one substantially horizontal attitude. Accordingly, rotation of the rock or pivot shaft 16 will move the lift members 14 and 18 and 21 up and down, depending upon the direction of rotation of the shaft 16, and that will correspondingly move the draft arm 23 up and down and as such it will cause the entire implement 13 to move up and down through the force exerted on the implement at the pin 26 and through the additional lift members which are not shown but which have been described and which are known to those skilled in the art and which are shown in the last two mentioned patents.

FIG. 2 shows the action of the lift members when the rock shaft 16 has been rotated clockwise through approximately a quarter turn, and thus the extending end 17 of the lift arm 14 is disposed substantially directly above the rock shaft 16. Of course if the link 18 is completely free to pivot relative to the arm 14, such as in the prior art arrangement shown in U.S. Pat. No. 3,399,733 then in the latter stages of pivotal movement of the arm 14, there would be only a minimal amount of vertical lift imposed upon the draft arm 23. As such, that is undesirable since the implement 13 would not be satisfactorily raised to say a transport position of maximum or desirable height. To overcome the aforementioned problem, the lift members of this invention are arranged so that they create optimum lift when the lift arm 14 is rotated between the FIG. 1 position and the FIG. 2 position. As such, the lift arm 14 and the link 18 have respective abutment surfaces 32 and 33 which engage each other at a location intermediate the positions of FIGS. 1 and 2, such as the position shown by the dot-dash lines in FIG. 2. That is, when the lift arm 14 is raised to a desired elevation, then the lift arm 14 and the link 18 interengage to become one solid link with respect to the lifting action, and therefore the effective point for the lifting action is no longer the pivot pin 19 but instead is the pivot pin 22, and thus there is amplification in the lifting action. Accordingly, where the link 18 is connected to the arm 14, it has projection 35, and arm 14 and the link 18 have their abutting surfaces 32 and 33 coming into contact at the dot-dash position shown in FIG. 2, from that lifting disposition and beyond, the effective lifting point is at the pin 22, and that is horizontally displaced from the axis of the rock or pivot shaft 16, and thus the pin 22 is still moving vertically as it moves along the arc designated A and therefore the maximum lifting action is induced between the dotted position and the full line position of FIG. 2, all as desired.

That is, in the FIG. 1 position, the arm 14 and the link 18 are disposed to have an angle B defined therebetween by the respective longitudinal axes or centerlines of the arm 14 and link 18. However, when the arm 14 reaches a position substantially as shown in the dot-dash lines in FIG. 2, then the angle between the arm 14 and the link 18 is reduced to the smaller angle designated C, and that angle C is retained between the two members throughout the additional lifting and even up to the vertical position of the arm 14 as shown in the solid lines in FIG. 2. As mentioned, the link 21 and the draft arm 23 are thus both moved in a maximum vertical displacement to create the maximum lift, as shown by the repositioning of the implement 13 in FIG. 2 compared to the retained and consistent elevation of the tractor frame piece 10 in FIG. 2, and of course the draft arm 23 is shown in an elevated position at its rear end 31, and the tractor piece 11 is repositioned from FIG. 1. for purposes of showing the piece 11 in FIG. 2. Of course, as previously mentioned, each side of the tractor has the lift members shown and described, and each would have the interlocking or abutting portions 32 and 33 for amplification of the lift, as described. Further, it will be apparent and understandable, to anyone skilled in the art, to mention and have the reader recognize that there could be one link extending between the pins 19 and 28, rather than the two links 18 and 21, and at least that could be the arrangement shown in U.S. Pat. No. 3,399,733 where one solid link or connector extends between the end of the lift arms and the two spaced-apart draft arms, all which is comparable to the arrangement mentioned herein.

The embodiment shown in FIGS. 3 and 4 is of the same effect and substantially the same arrangement as described and shown in connection with FIGS. 1 and 2, except for the detailed showings in FIGS. 3 and 4, and particularly for the fact that the embodiment of FIGS. 3 and 4 is for an adjustable type of lift amplifier. Accordingly, a lift arm 36 is pivotally mounted on the tractor 11 by means of the rock shaft 37 connected with the arm 36, and the arm extending end 38 has a pivot in 39 which articularly connects with a first link 41 which in turn articularly connects with a second link 42 through a pivot pin 43. FIG. 4 shows the side view of the arrangement, and it will here be seen that the positioning is comparable to that shown in FIG. 2 where the lift arm 36 is in its maximum raised position, though actually in both FIGS. 2 and 4, additional clockwise rotation of the arm 36 will cause further lifting of the respective pins 22 and 43 and thus further lifting of the draft arms 23. FIGS. 3 and 4 further show an adjustable plate 44 which is pivotally connected with the pin 39 and which is adjustably secured with the link 41 which is actually shown to be two spaced-apart members 41, as seen and as shown in FIG. 3. Thus the adjusting plate 44 extends between the links 41 and has two bolts 49 and 50 extending between the three members shown and described, and thus the plate 44 can be positioned in an adjustably set position relative to the lift links 41. As such, the plate 44 has an abutting surface 46 which abuts the mating surface 47 of the lift arm 36 to thus stop further pivotal action between the arm 36 and the link 41, just as described in connection with FIG. 2 from the dot-dash position to the solid-line position of the arm 14. As such, the adjustable arrangement in FIGS. 3 and 4 also creates the lift amplification desired herein. Accordingly, the arm 36 is actually bifurcated at the line designated 48, and thus the links 44 can extend between the spaced-apart extending ends 38 of the arm 36, such as in the FIG. 4 position. Again, the angle C, as shown in FIG. 4, would be established at some point between a substantially horizontal position of the arm 36, comparable to the position of the arm 14 in FIG. 1, and the vertical position of the arm 36 as shown in FIG. 4. Accordingly then the amplification of lift would be effected since the arm 36 and the link 41 would be in the nature of solid members so that the continued clockwise rotation of the arm 36 would cause the desired vertical displacement of the pin 43 and therefore create maximum lift for the draft arm 23 and the implement 13 attached thereto.

FIGS. 3 and 4 further show the arrangement for adjusting the plate 44 relative to the link 41, and that is arranged by having a series of bolt holes 51 extending through the plate 44 and having an arcuate bolt slot 52 in the plate 44, and these holes and the slot are for respective reception of the bolts 49 and 50. Accordingly, the positioning of the bolts 49 and 50 relative to the holes 51 and slot 52 will present the plate portion 46 in extended or retracted position relative to the longitudinal axis of the link 41 and thus the point at which the surfaces 46 and 47 come into abutment can be adjusted.

The two embodiments therefore show at least one lift link articularly connected between the lift arm and the draft arm, and both embodiments have a portion of either the lift arm or the link extending toward the other and into the angle formed by the longitudinal axes of the lift arm and the lift link. The mutually abutting surfaces between the lift arm and the lift link thus limit the minimum size of the formed angle to create the amplified lift effect, as described. Also, the torque moment arm for lifting is of an optimum efficient arrangement in that upon engagement of the two abutting surfaces, in each of the two embodiments, the moment art becomes the more effective arm extending more horizontally between the axes of the rock shafts 16 and 37 and the axes of the pivot pins 22 and 43, rather than the pivot pins 19 and 39 which are in a more elevated position with respect to the vertical lifting required (and thus the more upright position of the respective rock arms 14 and 36 themselves present a less effective moment arm for the lifting torque).

With regard to the adjustable embodiment, as seen in FIG. 4, it will of course be understood that the adjustment plate or member 44 is swingable about the axis of the pin 39, and thus the series of holes 51 and the arcuate slot 52 are centered about that axis, and the bolts 49 and 50 present the fasteners for retaining the adjustment plate 44 in a desired set position, and the position shown in FIG. 4 presents the bolts 49 and 50 in the lowest lift position. Also, the lift members described have bifurcated ends, such as ends 38 on arm 36, and the ends of arm 14 beyond the dotted line 53.

What is claimed is:

1. A tractor implement lift height amplifier comprising a tractor, a lift arm and a draft arm both pivotally mounted on said tractor for up and down movement relative to said tractor and extending therefrom and with said draft arm being pivotally mounted at an elevation lower than that of said lift arm and being arranged to have an implement connected therewith for draft-connecting and lifting the implement relative to said tractor, at least one lift link pivotally connected at its opposite ends respectively on both said arms at locations on said arms spaced from the pivot axis of said arms to thereby form an angle with said lift arm and being arranged to transmit the upward pivotal movement of said lift arm to said draft arm for lifting the implement, and one of said lift arm and said lift link having a portion thereof extending toward the other and into the confines of said angle therebetween and with the extending end of said portion and said other of said lift arm and said lift link having mutually abutting surfaces disposed on a common path of upward movement of said lift link to have said surfaces abut each other and thereby limit the minimum size of said angle and restrict further relative pivotal action between said lift arm and said lift link.

2. The tractor implement lift height amplifier as claimed in claim 1, including a member movably mounted on one of said lift arm and said lift link and projecting into said angle and having one of said abutting surfaces, and a fastener operatively associated with said member for releasably fixing said member relative to said one of said lift arm and said lift link.

3. The tractor implement lift height amplifier as claimed in claim 2, wherein said member is pivotally mounted on one of the ends of said lift arm for pivotal adjusting movement of said one abutting surface toward and away from said lift arm.

4. The tractor implement lift height amplifier as claimed in claim 3, wherein said member is a plate having a plurality of adjusting holes therein centered about the pivot axis of said plate, and said fastener is a bolt extending through selected ones of said holes for the releasable fixing of said member.

5. The tractor implement lift height amplifier as claimed in claim 4, wherein said plate is pivotally mounted axially relative to the pivot axis of said lift arm.

6. The tractor implement lift height amplifier as claimed in claim 1, wherein said lift link includes two lift link portions pivotal in end-to-end relation and extending between and being respectively pivotally connected to said lift arm and said draft arm.

7. The tractor implement lift height amplifier as claimed in claim 6, including a member movably mounted on one of said lift arm and the one of said lift link portions connected to said lift arm and projecting into said angle and having one of said abutting surfaces, and a fastener operatively associated with said member for releasably fixing said member relative to said one of said lift arm and said one of said lift link portions.

8. The tractor implement lift height amplifier as claimed in claim 7, wherein said member is pivotally mounted on one of the ends of said lift arm for pivotal adjusting movement of said one abutting surface toward and away from said lift arm.

9. The tractor implement lift height amplifier as claimed in claim 8, wherein said member is a plate having a plurality of adjusting holes therein centered about the pivot axis of said plate, and said fastener is a bolt extending through selected ones of said holes for the releasable fixing of said member.

10. The tractor implement lift height amplifier as claimed in claim 9, wherein said plate is pivotally mounted axially relative to the pivot axis of said lift arm.

* * * * *